United States Patent
Bradski et al.

(10) Patent No.: US 11,080,861 B2
(45) Date of Patent: Aug. 3, 2021

(54) SCENE SEGMENTATION USING MODEL SUBTRACTION

(71) Applicant: Matterport, Inc., Sunnyvale, CA (US)

(72) Inventors: Gary Bradski, Palo Alto, CA (US); Ethan Rublee, Mountain View, CA (US)

(73) Assignee: Matterport, Inc., Sunnyvale, CA (US)

( * ) Notice: Subject to any disclaimer, the term of this patent is extended or adjusted under 35 U.S.C. 154(b) by 115 days.

(21) Appl. No.: 16/412,031

(22) Filed: May 14, 2019

(65) Prior Publication Data
US 2020/0364877 A1 Nov. 19, 2020

(51) Int. Cl.
G06K 9/34 (2006.01)
G06T 7/194 (2017.01)
G06K 9/62 (2006.01)
G06T 7/155 (2017.01)
G06T 7/174 (2017.01)

(52) U.S. Cl.
CPC ............ G06T 7/194 (2017.01); G06K 9/6257 (2013.01); G06T 7/155 (2017.01); G06T 7/174 (2017.01)

(58) Field of Classification Search
CPC .... G06K 9/00671; G06K 9/46; G06K 9/6202; G06K 9/6261; G06K 9/66; G06K 9/4652; G06T 2207/20081; G06T 7/00; G06T 2207/10016; G06T 2207/10024; G06T 2207/20084; G06T 7/11; G06T 7/20; G06T 19/20; G06T 17/00; G06T 7/337; G06T 2207/30244; G06T 7/194; G06T 7/10; G06T 7/75
See application file for complete search history.

(56) References Cited

U.S. PATENT DOCUMENTS

| | | |
|---|---|---|
| 6,226,004 B1 | 5/2001 | Nishihara |
| 6,985,620 B2 | 1/2006 | Sawhney et al. |
| 7,227,893 B1 * | 6/2007 | Srinivasa ............ G06K 9/00771 348/155 |
| 8,131,012 B2 | 3/2012 | Eaton et al. |
| 8,285,044 B2 | 10/2012 | Niem et al. |
| 8,576,303 B2 | 11/2013 | Vendrig |
| 9,558,268 B2 | 1/2017 | Tuzel et al. |
| 9,805,271 B2 | 10/2017 | Cobb et al. |
| 10,089,743 B1 | 10/2018 | Kim et al. |
| 10,621,779 B1 * | 4/2020 | Topiwala .................. G06T 7/62 |

(Continued)

OTHER PUBLICATIONS

Zeng et. al, Background Subtraction Using Multiscale Fully Convolutional Network, 2018 IEEE, Digital Object Identifier 10.1109/Access.2018.2817129, vol. 6, pp. 1610-1621.*

(Continued)

*Primary Examiner* — Guillermo M Rivera-Martinez (74) *Attorney, Agent, or Firm* — Ahmann Kloke LLP (57) ABSTRACT

Systems and methods for frame and scene segmentation are disclosed herein. A disclosed method includes providing a frame of a scene. The scene includes a scene background. The method also includes providing a model of the scene background. The method also includes determining a frame background using the model and subtracting the frame background from the frame to obtain an approximate segmentation. The method also includes training a segmentation network using the approximate segmentation.

16 Claims, 7 Drawing Sheets

(56) References Cited

U.S. PATENT DOCUMENTS

| | | | | |
|---|---|---|---|---|
| 2003/0058341 | A1* | 3/2003 | Brodsky | G08B 21/043 |
| | | | | 348/169 |
| 2004/0081335 | A1* | 4/2004 | Kondo | G06T 7/254 |
| | | | | 382/107 |
| 2005/0169529 | A1* | 8/2005 | Owechko | G06K 9/469 |
| | | | | 382/190 |
| 2009/0262217 | A1* | 10/2009 | Mack | H04N 5/272 |
| | | | | 348/239 |
| 2011/0149117 | A1* | 6/2011 | Vendrig | H04N 5/2226 |
| | | | | 348/239 |
| 2011/0164823 | A1* | 7/2011 | Park | G06T 7/12 |
| | | | | 382/199 |
| 2012/0206577 | A1* | 8/2012 | Guckenberger | G09B 19/003 |
| | | | | 348/47 |
| 2016/0050465 | A1* | 2/2016 | Zaheer | H04N 21/6581 |
| | | | | 725/34 |
| 2017/0116750 | A1* | 4/2017 | Pond | G06T 7/37 |
| 2017/0148223 | A1* | 5/2017 | Holzer | G06F 16/532 |
| 2017/0278289 | A1* | 9/2017 | Marino | G06Q 30/0276 |
| 2018/0189951 | A1 | 7/2018 | Liston et al. | |
| 2018/0189974 | A1 | 7/2018 | Clark et al. | |
| 2020/0302686 | A1* | 9/2020 | Totty | G06T 17/05 |
| 2020/0342652 | A1* | 10/2020 | Rowell | G06T 7/85 |

OTHER PUBLICATIONS

V. Badrinarayanan, et al., SegNet: A Deep Convolutional Encoder-Decoder Architecture for Robust Semantic Pixel-Wise Labelling, CVPR' 15, 1468, Nov. 14, 2014, 10 pages.

Y. Boykov, et al., Interactive Graph Cuts for Optimal Boundary & Region Segmentation of Objects in N-D Images, Proc. Int. Conf. on Computer Vision, vol. I, p. 105, Vancouver, Canada, Jul. 2001, 8 pages.

* cited by examiner

SCENE SEGMENTATION USING MODEL SUBTRACTION

BACKGROUND

Segmentation involves selecting a portion of an image to the exclusion of the remainder. Image editing tools generally include features such as click and drag selection boxes, free hand "lasso" selectors, and adjustable cropping boxes to allow for the manual segmentation of an image. Certain image editors also include automated segmentation features such as "magic wands" which automate selection of regions based on a selected sample using an analysis of texture information in the image, and "intelligent scissors" which conduct the same action but on the bases of edge contrast information in the image. Magic wands and intelligent scissor tools have a long history of integration with image editing tools and have been available in consumer-grade image editing software dating back to at least 1990. More recent developments in segmentation tools include those using an evaluation of energy distributions of the image such as the "Graph Cut" approach disclosed in Y. Boykov et al., *Interactive Graph Cuts for Optimal Boundary & Region Segmentation of Objects in N-D Images*, Proceedings of ICCV, vol. I, p. 105, Vancouver, Canada, July 2001.

In certain applications, the segmentation is semantic in that a portion of an image associated with a given meaning is segmented to the exclusion of other portions. One example of a semantic segmentation problem is segmenting the foreground of an image from the background where pixels associated with the foreground are segmented from pixels associated with the background. However, segmentation targets can include more specific targets than what is traditionally considered the foreground of an image and can include specific subjects in the image such as an individual actor, an article of clothing, a hand, or any other portion of the image with a defined semantic association. In general, the portion of the image which is not part of the subject can be referred to as the "background" in this disclosure as the background is defined with reference to the segmentation of the image as opposed to the vantage point of the image.

Segmenting can involve generating a hard mask, which labels each pixel using a one or a zero to indicate if it is part of the foreground or background, or generating an alpha mask, which labels each pixel using a value from zero to one which allows for portions of the background to appear through a foreground pixel if the foreground is moved to a different background. The "segmentation" of the image can refer to the geometric arrangement of these masks relative to the image and can be represented by the mask values mentioned above or the values of the original image.

Recent development in image segmentation has been driven by the need to extract information from images available to machine intelligence algorithms studying images on the Internet and for facilitating autonomous vehicle awareness. A common tool used for this kind of image analysis is a convolutional neural network (CNN). A CNN is a specific example of an artificial neural networks (ANNs). CNNs involve the convolution of an input image with a set of filters that are "slid around" the image data to test for a reaction from a given filter. The filters serve in place of the variable weights in the layers of a traditional ANN. A segmentation tool that utilizes this type of trained network architecture is described in V. Badrinarayanan, et al., *SegNet: A Deep Convolutional Encoder-Decoder Architecture for Robust Semantic Pixel-Wise Labelling*, CVPR' 15, 1468, Nov. 14, 2014.

Figure 1:
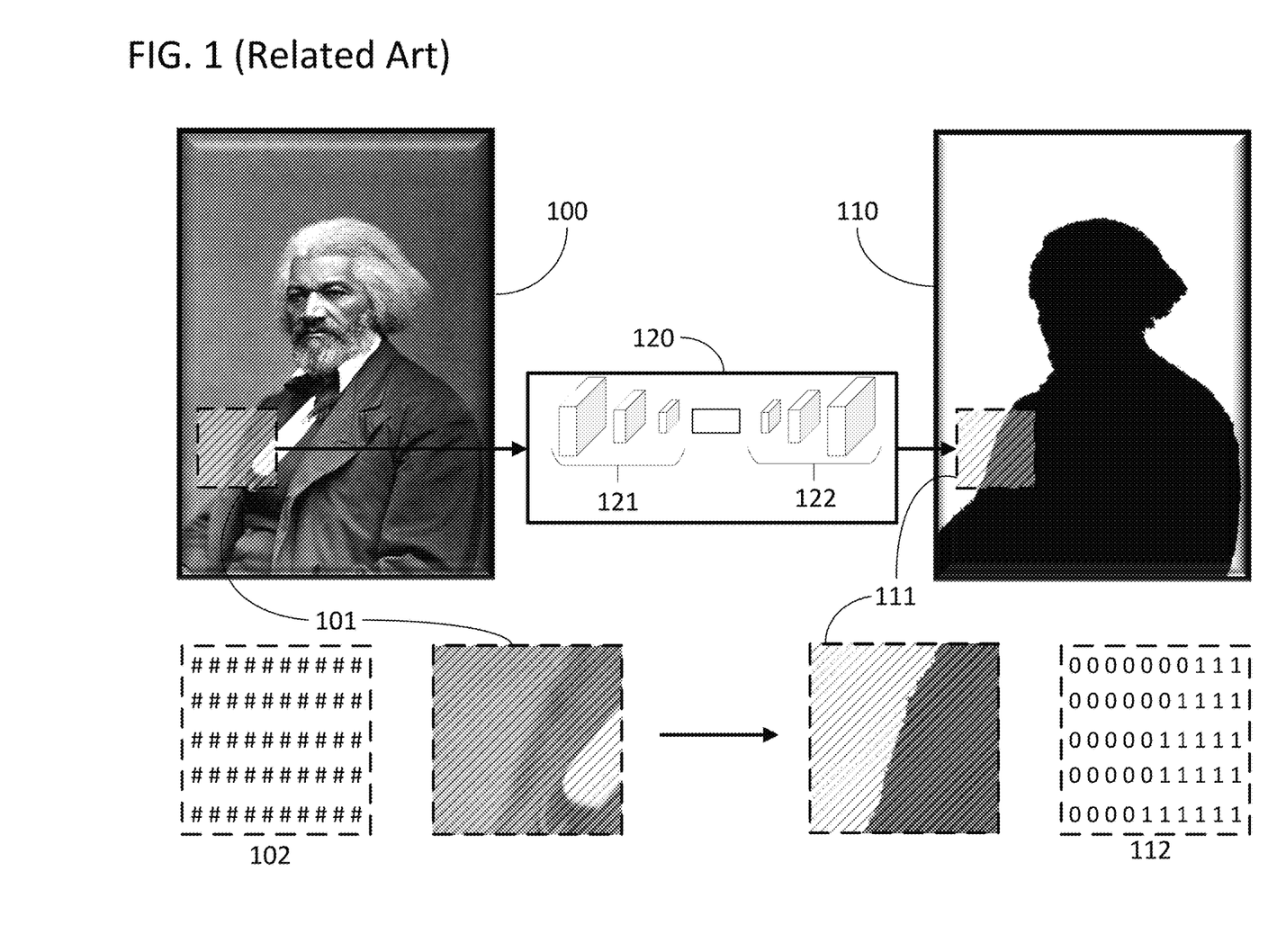
FIG. 1 is a data flow diagram illustrating the operation of an automated segmentation network in accordance with the related art.

FIG. 1 includes a portrait 100 which is being segmented by a CNN 120 into a hard mask 110. The CNN 120 includes an encoder section 121 and a decoder section 122. The CNN operates on sub-units of the input image which are equal in size to the input size of the CNN. In the illustrated case, CNN 120 generates output 111 using input 101. Input 101 can be a grey scale or RGB encoding 102 in which each pixel value is represented by one or more numerical values used to render the image. Output 111 can be a hard mask encoding 112 in which each element corresponds to either a 1 or a 0. As illustrated, the hard mask values can be set to 1 in the foreground and 0 in the background. Subsequently, when the Hadamard product of the mask 112 and image encoding 102 is calculated, all the background pixels will be set to zero and all the foreground pixels will retain their original values in the image encoding 102. As such, the hard mask can be used to segment the foreground of the original image from the background The networks mentioned above can be trained via supervised learning in which a large amount of training data entries, each of which includes a ground truth solution to a segmentation problem along with corresponding image data, are fed into the network until the network is ultimately able to execute analogous segmentation problems using only raw image data. The training process involves iteratively adjusting the weights of the network (e.g., filter values in the case of CNNs). The result is a trained network capable of identifying a specific target such as "cats" or "pedestrian" in any image provided as an input to the network.

SUMMARY

This disclosure is directed to segmentation using trained segmentation networks. This disclosure is also directed to methods for synthesizing training data to be used to train such segmentation networks. The segmentation can be used to segment a frame. The frame can be a single image from a scene comprising a series of frames. The networks can be directed graph function approximators with adjustable internal variables that affect the output generated from a given input. The networks can be deep nets. The adjustable internal variables can be adjusted using back-propagation and a supervised learning training routine. The networks can be artificial neural networks (ANNs) such as convolutional neural networks (CNNs). The frame can be made up of many primary elements. For example, the frame can be a large two-dimensional matrix of pixel values, where the pixels and pixel values form the primary elements of the frame. The pixel values can be standard RGB or grey scale values, but they can also include additional information such as depth information, lighting information, surface information, and can generally be hyperspectral encodings. For example, the frame could be a 2.5-dimensional RGB depth cloud encoded by RGB-D pixel values.

While ANNs and associated approaches have unlocked entirely new areas of human technical endeavor and have led to advancements in fields such as image and speech recognition, they are often limited by a lack of access to solid training data. ANNs are often trained using a supervised learning approach in which the network must be fed tagged training data with one portion of the training data set being a network input and one portion of the training data set being a ground truth inference that should be drawn from that input. The ground truth inference can be referred to as the supervisor of the training data set. However, obtaining large amounts of such data sets can be difficult. In the specific case of frame segmentation, it can be difficult to obtain the necessary amount of tagged training data for a supervised learning routine for each of the primary elements in the frame (e.g., marking each pixel in an image as either part of the subject or part of the background can take a large amount of time).

Considering the above, this disclosure includes systems and methods for synthesizing a large volume of training data to train a segmentation network using a limited amount of human effort and computational resources. In specific embodiments of the invention, this rapid generation of useful training data is available because the data is being generated to over train a segmentation network for a specific frame, scene, or set. As used in this disclosure, overtraining refers to a known, and usually undesirable, occurrence in which a trainable directed graph has been trained so much on a given set of test data that it will no longer function as desired when applied to a generalized set of raw data.

The specific application of segmenting a scene provides an appealing opportunity for a network that is over trained on a given frame. Due to the likelihood of a low statistical variation between the frames in a scene, a network that would traditionally be considered over trained on a frame can still, if trained using training data synthesized using the approaches disclosed herein, function to accurately segment additional frames in the same scene. In particular, sets (such as a broadcast studio) and fixed locales (such as sports fields or race tracks) present an opportunity for an over trained network on a particular frame to still function appropriately across a scene. Also, any scene where the shot stays fixed while objects within the scene move presents a similar opportunity for an over trained network to function appropriately across the scene. Accordingly, the approaches disclosed herein can be used to generate training data to produce a segmentation network which will effectively change any arbitrary background or entire set into the equivalent of a "green screen" for facilitating segmentation.

In specific embodiments of the invention, a frame and a model of a scene are provided in order to generate training data to train a network. The network can then be used to segment the frame, segment frames from the same scene, segment frames captured on the same set, or segment frames captured on similar sets. A subject and a background are tagged on the frame by first generating a background of the frame using a model of the scene from which the frame was taken. For example, the model could be a quantitative description of a green screen used when the frame was captured. As another example, the model could be a three-dimensional computer model of the scene. The background is then subtracted from the frame to generate an approximate segmentation. The approximate segmentation can then be applied to the frame to generate tags for the subject and background in the frame. As a result, training data has been generated for the primary elements (e.g., pixels) in the frame. In specific embodiments of the invention, an additional layer of processing can be conducted on the approximate segmentation to generate tags for the subject and background of the frame. For example, a dilate and erode operation on the approximate segmentation could be used to increase confidence in the tags before they are used to train a network as will be described below. The frame and the tags generated in accordance with these embodiments can then be used as synthesized training data to train the network where the frame serves as an input and the tagged frame serves as a supervisor.

In specific embodiments of the invention, a computer implemented method is provided. The method includes providing a frame of a scene. The scene includes a scene background. The method also includes providing a model of the scene background. The method also includes determining a frame background using the model and subtracting the frame background from the frame to obtain an approximate segmentation. The method also includes training a segmentation network using the approximate segmentation.

DETAILED DESCRIPTION

Specific methods and systems associated with segmentation networks and synthesizing training data for those segmentation networks in accordance with the summary above are provided in this section. The methods and systems disclosed in this section are nonlimiting embodiments of the invention, are provided for explanatory purposes only, and should not be used to constrict the full scope of the invention.

Figure 2:
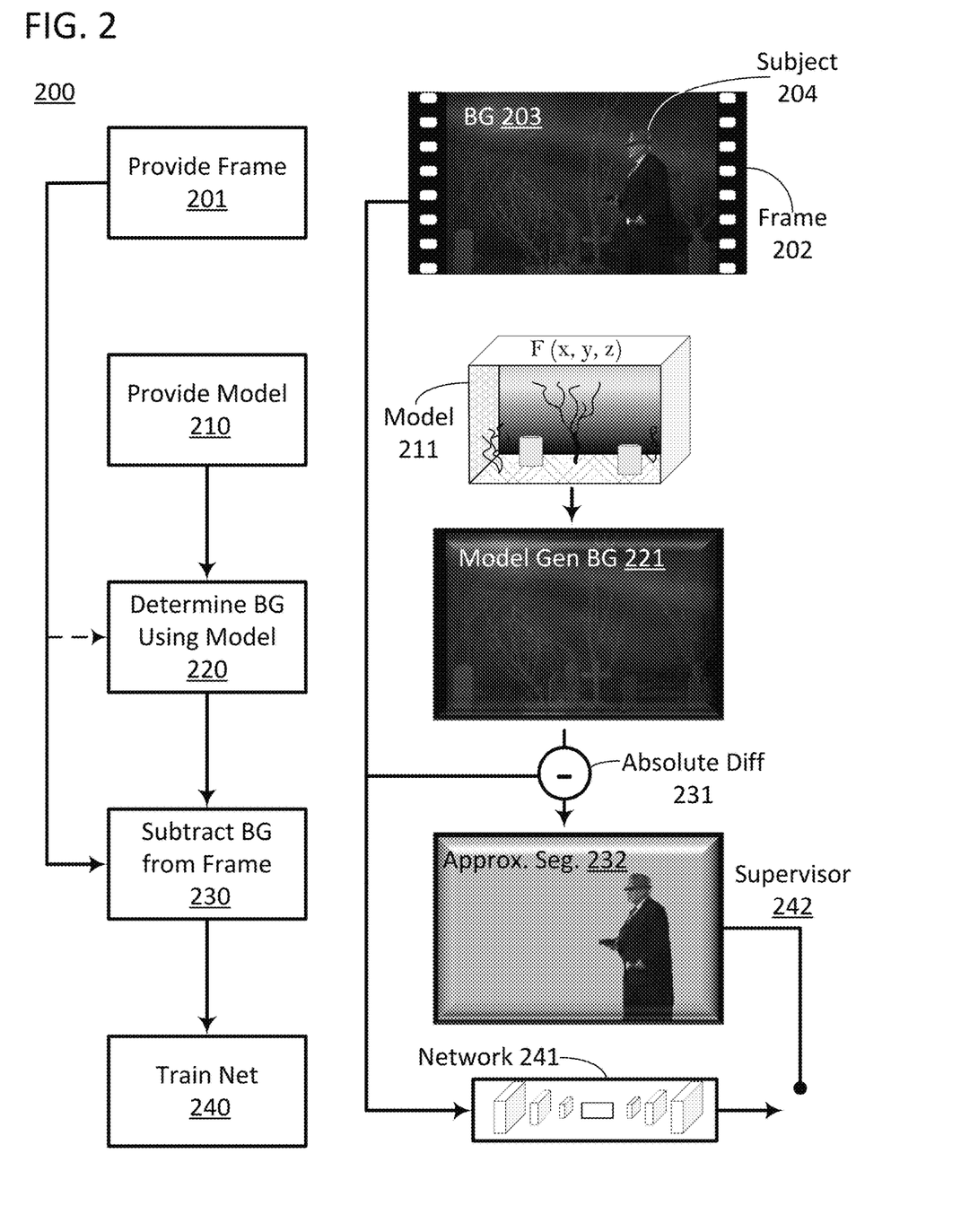
FIG. 2 is a flow chart for a set of methods for training a segmentation network in accordance with specific embodiments of the invention.

FIG. 2 provides a flow chart 200 for a set of computer-implemented methods in which training data is synthesized and a network is trained using that synthesized training data. The network is illustrated as a convolutional neural network (CNN) 241. Network 241 is being trained to segment subjects from backgrounds and can be referred to as a segmentation network. Flow chart 200 includes a step 201 of providing a frame 202 of a scene. The scene can include a scene background. Frame 202 includes a frame background 203 which is a view of the scene background from the camera pose associated with frame 202. In frame 202, frame background 203 is partially occluded by subject 204. In the illustrated situation, the subject is an actor with a graveyard set serving as the scene background, and the frame background is the view of the graveyard from the perspective of the camera when frame 202 was captured.

Flow chart 200 also includes a step 210 of providing a model 211 of the scene background. The two steps are not drawn as being executed in series because they can be conducted in either order. The frame and model can be provided by entirely separate systems and there is no general limitation on which is available first. In specific embodiments of the invention, the model provided in step 210 can be any model sufficient to generate a frame with the same format as frame 202 such that mathematical operations and computer vision computations can treat the frame 202 and the frame produced using model 210 as frames captured from the same scene with and without subject 204 present in the scene and all else equal. For example, if frame 202 were a two-dimensional array of pixel values, the model could be any three-dimensional graphics mesh from which two-dimensional projections of pixel values could be derived. As illustrated, model 211 is a full three-dimensional model of the scene with depth, texture, and surface information available for each three-dimensional voxel in the scene. The model also includes lighting information which can be either fixed lighting descriptions for each voxel in the scene used to render the scene in a single lighting condition, or variable lighting sources that can be used to render an image of the scene under any arbitrary lighting condition using the lighting information and the aforementioned depth, texture, and surface information.

Flow chart 200 continues with a step 220 of determining a frame background using the model. The model can be used to generate a model-generated background 221 for this purpose. For example, if the model were the 6 DOF model mentioned in the prior paragraph, step 220 could involve generating a rendering of a frame using the same camera pose as was used to capture frame 202. However, in the illustrated case, in which the model 211 is a three dimensional model of the scene and the frame 202 is a two dimensional array of grey scale pixel values, the model-generated background is generated by determining the lighting conditions associated with the capture of frame 202, applying those lighting conditions to the model, determining the camera position and camera pose associated with the capture of frame 202, applying those coordinates to the three dimensional model to generate a projection therefrom, and rendering the projection as a two dimensional model generate background 221 with the same grey scale pixel values as frame 202. In other approaches, such as when the model is a statistical model of a fixed perspective scene, determining the background can involve calculating the expected variation in any given pixel value of the background attributable to camera calibration and lighting condition variation which are not attributable to the presence of a subject in that pixel. This statistical model can then be used to analyze the primary elements of frame 202 in the next step. In this approach, and others like it, the model is not conducive to the generation of a visual representation of a background but it still models the characteristics of a background which are important for the execution of the remainder of flow chart 200.

The model, and the determination of a background therefrom, can take on various forms depending upon what segmentation task will ultimately be conducted by network 241. The model can be a capture of a given shot or scene with certain items, for example the subject, removed. The model could also be a three-dimensional model of a scene or set in the form of a three-dimensional colored point cloud or a three-dimensional graphics mesh. The model might include material properties, lighting models, and lighting source definitions (including types and locations) in the scene. The model might also be registered with an assigned frame of reference. Registration could be conducted using explicit or implicit fiducials entered in a physical set when the set, scene, or shot is captured for purposes of making the model. For example, April tags or other trackable tags could be placed in the physical set to be acted upon by a computer vision system to derive the camera pose of any given shot or to generally assist tin the registration of the model. This could also be conducted using virtual fiducials entered in the three-dimensional model which are matched to physical fiducials added to a physical space. The physical space could be the space where frame 202 is captured.

If network 241 is being trained to segment subjects from a fixed perspective scene, the model may be generated via a capture of a set of frames from that fixed perspective captured without the subject present. This clean plate capture could then be used to generate a statistical model of the variation in the value of the primary elements in the set of frames from that fixed perspective. This could involve fitting gaussian models of mean and variance to each primary element or group of primary elements in the clean plate capture from the fixed perspective. The variance could be associated with noise in the pixel values caused by lighting and camera calibration drift which would determine the statistical model.

Determining a frame background from the type of statistical model described in the prior paragraph could involve conducting an element-wise analysis of the primary element values in the frame with the variances of the corresponding primary elements in the model. If the value of a particular primary element is within the corresponding variance, it could be considered to be part of the background. If the value of an element is outside the corresponding variance, it could be considered to be part of the subject. As this approach would only be able to generate the background with reference to the frame itself, the flow chart would need to include a link from frame 201 to the determining background step 220 which is shown with a dotted line because it is not needed for every implementation illustrated by the flow chart. The primary elements in the frame could correspond to the primary elements in the model in the sense that the model and frame have the same dimensions and describe a scene from the same perspective such that primary elements with like coordinates in the data structure of the frame and data structure of the model correspond.

If network 241 is being trained to segment subjects from a varying perspective scene which follows a path, the model could include a clean plate scene background using the path and a network that infers frame backgrounds from camera poses and the clean plate scene background. In these embodiments, determining a frame background from the model could include deriving a camera pose for the frame, and inferring the frame background from the camera pose using the network and the clean plate scene background.

If network 241 is being trained to segment subjects from a chroma screen, the model could include reviewing a captured scene or frame, with or without the subject present, and fitting an intensity plane to the chroma screen in the frame. In other words, providing the model would involve fitting an intensity plane to the chroma screen in the frame. Determining a frame background from the model would then comprise mixing an average chroma of the chroma screen with the intensity plane.

If network 241 is being trained to segment subjects from a varying perspective scene such as a crane or tracking shot wherein the perspective follows a path, the model could be a capture of the scene from that varying perspective captured without the subject present. Such a capture can be referred to as a tracking shot clean plate. For varying perspective scenes, such as crane or tracking shots, the model could alternatively be a colored depth graph or graphics mesh model with a single degree of freedom associated with the movement of the perspective with time. The model could additionally include lighting, depth, and surfaces information in order to allow for the matching of lighting conditions.

If network 241 is being trained to segment subjects from a fixed set or locale for which frames will be captured using varying perspectives, the model could be a full photorealistic six degree of freedom (6 DOF) graphical model of the physical space. A 6 DOF model is one that allows for the generation of images of the physical space with 6 DOF camera pose flexibility, meaning images of the physical space can be generated from a perspective set by any coordinate in three-dimensional space: (x, y, z), and any camera orientation set by three factors that determine the orientation of the camera: pan, tilt, and yaw. The model could additionally include lighting, depth, and surfaces information in order to allow for the matching of lighting conditions.

Flow chart 200 continues with a step 230 of subtracting the frame background from the frame to obtain an approximate segmentation. The frame background can be the model-generated background 221 determined in step 220. The approximate segmentation could be set equal to the remainder of that subtraction or it could be set equal to the remainder of that subtraction plus a settable distance. The settable distance could be measured in primary elements and could be applied morphologically to the boarder of the remainder. The approximate segmentation can be an approximate segmentation 232 of the frame subject. The operation can include an absolute difference operation 231. The result of the absolute difference operation can be a set of zero, or near zero values, and a set of larger values. The spatial distribution of the larger values can be conceptualized as the approximate segmentation. In the illustrated case, the approximate segmentation 232 is shown as having generally isolated subject 204 from frame 202. In the illustrated case, the subject has the same pixel values as in frame 202. However, those of ordinary skill will recognize that absolute difference operation 231 would result in a set of values that are not identical to subject 204. Instead, post processing involving a step of rounding to zero and one, a step of creating a hard mask, and then a step of calculating the Schur product of frame 202 and approximate segmentation 232 would result in an image like the one shown. The operation used in step 230 could also involve determining if any primary element values in the frame are outside of a range determined from a statistical model of the background and setting all other primary element values in the frame to zero or some other value to be associated with the background for purposes of segmentation.

The approximate segmentation can be used to train a segmentation network by assisting with the tagging of primary element values in the frame as being part of either the subject of background. Flow chart 200 continues with a step 240 of training a segmentation network using the approximate segmentation obtained in step 230. In the illustrated case, the approximate segmentation is used in that it assists with the tagging of data for the creation of a supervisor 242 for a supervised training routine. During the training routine, the frame 202, or a portion thereof, can be applied as an input to network 241 and the inference generated therefrom can be compared to the supervisor 242 for purposes of training the network by updating its adjustable values. Numerous iterations of the steps of flow chart 200 can be conducted in order to generate a large volume of training data for training segmentation network 241. After the network is trained it can be used to segment the frame, a second frame from the same scene, or a second frame from a scene shot in front of the same set depending upon what application the network was trained for.

The execution of step 204 can involve a supervised training routine. The execution of step 240 can involve tagging a first portion of frame 202, included in the approximate segmentation, with a subject tag. The tag can be used to indicate that the ground truth of the primary elements of the frame within the first portion of frame 202 is that they are part of the subject. The execution of step 240 can further involve tagging a second portion of frame 202, excluded from the approximate segmentation with a background tag. The tag can be used to indicate that the ground truth of the primary elements of the frame within the second portion of frame 202 is background. The two portions do not need to define the entire frame, as there can be one or more exclusion regions in the frame, including in a boundary region between the two portions. The tags can both be explicit values assigned to the primary elements in each portion, or one tag can be implied via the absence of another. The execution of step 204 can further involve generating a segmentation inference from network 241 using frame 202. Frame 202 can be an input to segmentation network 241 for purposes of obtaining this segmentation inference. The execution of step 204 can further include evaluating the segmentation inference with at least one of the subject tag and the background tag. The evaluation can be used to determine where the inference generated from network 241 failed (e.g., which primary elements were misidentified). The evaluation can further be used to update the adjustable values that define the network using approaches such as backpropagation in order to guide the network towards a state in which every primary element is properly identified.

In specific embodiments of the invention, an additional layer of processing can be conducted on the approximate segmentation to generate tags for the subject and background of the frame. This additional layer of processing can be used to identify the first and second portions of the frame discussed above in relation to the execution of the training step 240. This additional layer of processing can include correction inputs provided to the segmentation in order to clean up the segmentation and match the segmented foreground to the frame prior to using it for tagging training data. The segmentation can be corrected for lighting matching, to clean up noise, and other segmentation and image matching corrections known in the art. Example of these correction inputs are disclosed in U.S. patent application Ser. Nos. 16/411,657 and 16/411,739 which have been filed concurrently herewith and are incorporated by reference herein in their entirety for all purposes. The segmentation correction inputs can be provided by a user in a segmentation editor or by an automated system.

In specific embodiments of the invention, a dilate and erode operation is conducted on the approximate segmentation by a fixed or adjustable number of primary elements. The dilate and erode operations can involve morphologically dilating the approximate segmentation and morphologically eroding the approximate segmentation to define the second and first portions of the frame respectively and as discussed above in relation to the execution of training step 240. The dilate and erode operations could be used to increase confidence in the tags before they are used to train a network. The confidence for subject tags would increase proportionally with the extent of the erosion. The confidence for the background tags would increase proportionally with the extent of the dilation. Both operations could be conducted on a single approximate segmentation to increase the confidence of both tags. For example, by dilating out the approximate segmentation to tag primary elements outside a first resulting boundary as background and eroding the approximate segmentation to tag primary elements inside a second resulting boundary as part of the subject. The dilation and erosion could be conducted morphologically with the boundary of the approximate segmentation. The first and second boundaries could create a tri-map with the region between the boundaries marked as indeterminate.

The fixed number of primary elements used for the erosion and dilation could be set by an automated system or manually. In specific embodiments of the invention the fixed number could be on the order of 1-10 primary elements (e.g., 1-10 pixels). The fixed number could also be set based on a degree of uncertainty measured when the approximate segmentation is produced. For example, if an absolute difference operation between the model generated background 211 and frame 203 created many values that were proximate but not equal to zero, the number of pixels for the erosion and dilation could be set higher to account for the potential uncertainty associated with that result. The number of primary elements for both the erosion and dilation could also be set by the users using a user interface element. Examples of this types of user interface elements are disclosed in U.S. patent application Ser. No. 16/411,739.

Figure 3:
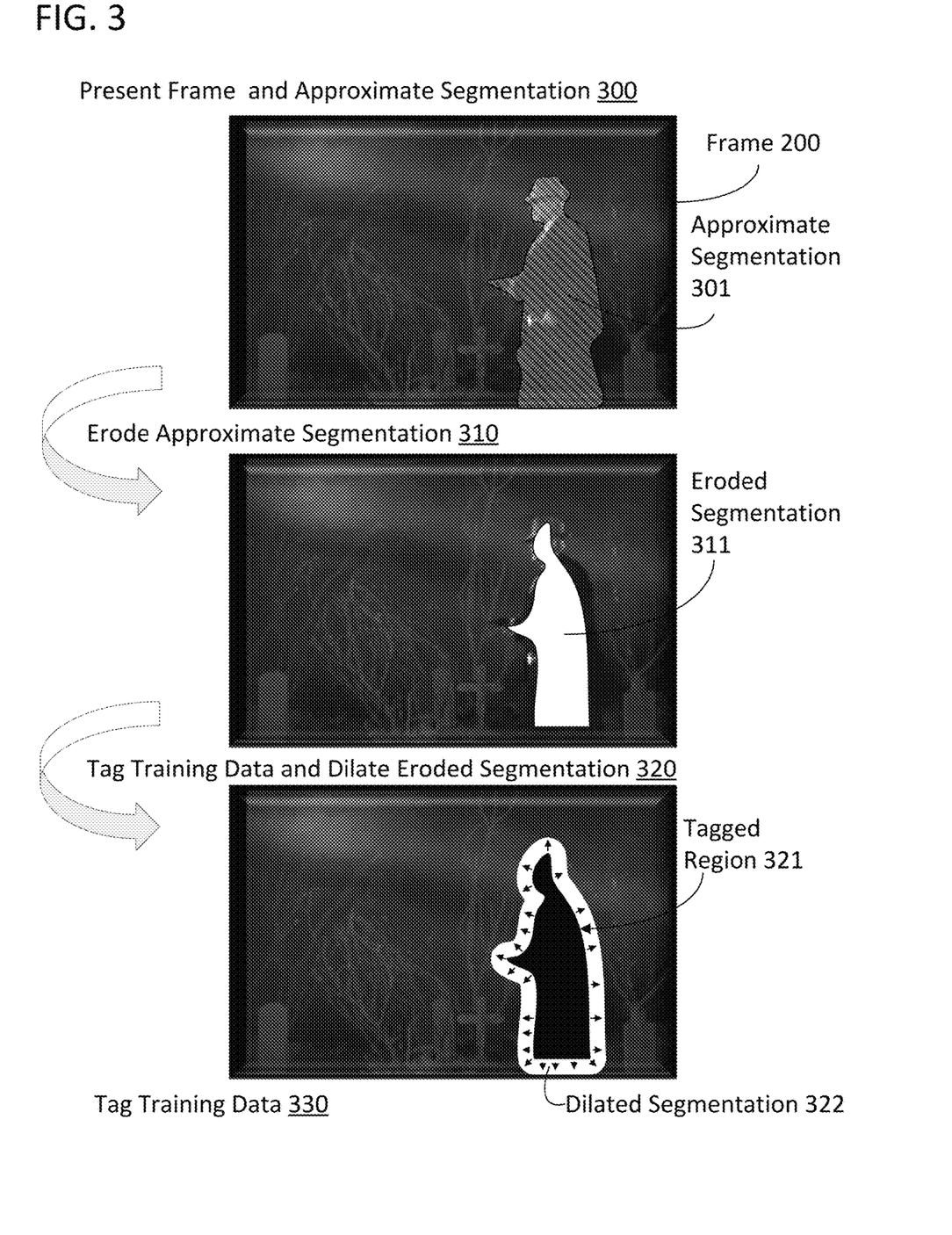
FIG. 3 is a flow chart for a set of methods for post processing an approximate segmentation in order to enhance the confidence in tags generated therefrom in accordance with specific embodiments of the invention.

FIG. 3 is a flow chart for a set of methods for post processing an approximate segmentation in order to enhance the confidence in tags generated therefrom. The flow chart begins with a step 300 of presenting a frame and an approximate segmentation. The presentation can be to a user in a segmentation editor. As illustrated, frame 200 is shown with segmentation 301 overlain thereon. This presentation allows a user to visibly inspect the segmentation and determine where it may have failed by either over or under segmenting the image.

The flow chart continues with a step 310 of eroding the approximate segmentation. The erosion can be conducted by the user using a sliding scale, mouse wheel, or key board input. The erosion can be morphological and can continue until the entire region defined by eroded segmentation 311 is located within the ground truth area of the subject in frame 200. The user can be prompted to erode the segmentation until the eroded segmentation 311 is just barely, but entirely, within the ground truth area occupied by the subject in order to maximize the amount of high confidence training data that is harvested from frame 200.

The flow chart continues with a step 320 of tagging the training data and dilating the eroded segmentation. Once step 310 has been completed, the user can enter a command to accept the eroded segmentation. At that point, the system can tag all the primary elements located within the ambit of eroded segmentation 311 as subject elements. As shown, the eroded segmentation can change color to indicate that it has been locked in as the tagged subject region 321. The user can then be provided, possibly via the same user interface used for step 310, to dilate the eroded segmentation back out. The user can be prompted to dilate the segmentation until the dilated segmentation 322 is just barely, but entirely, outside the ground truth area occupied by the subject in order to maximize the amount of high confidence training data that is harvested from frame 200. The flow chart then terminates with a step 330 of tagging the training data. The training data tagged in step 330 are the primary elements located outside the ambit of dilated segmentation 322, which are tagged as background.

Figure 4:
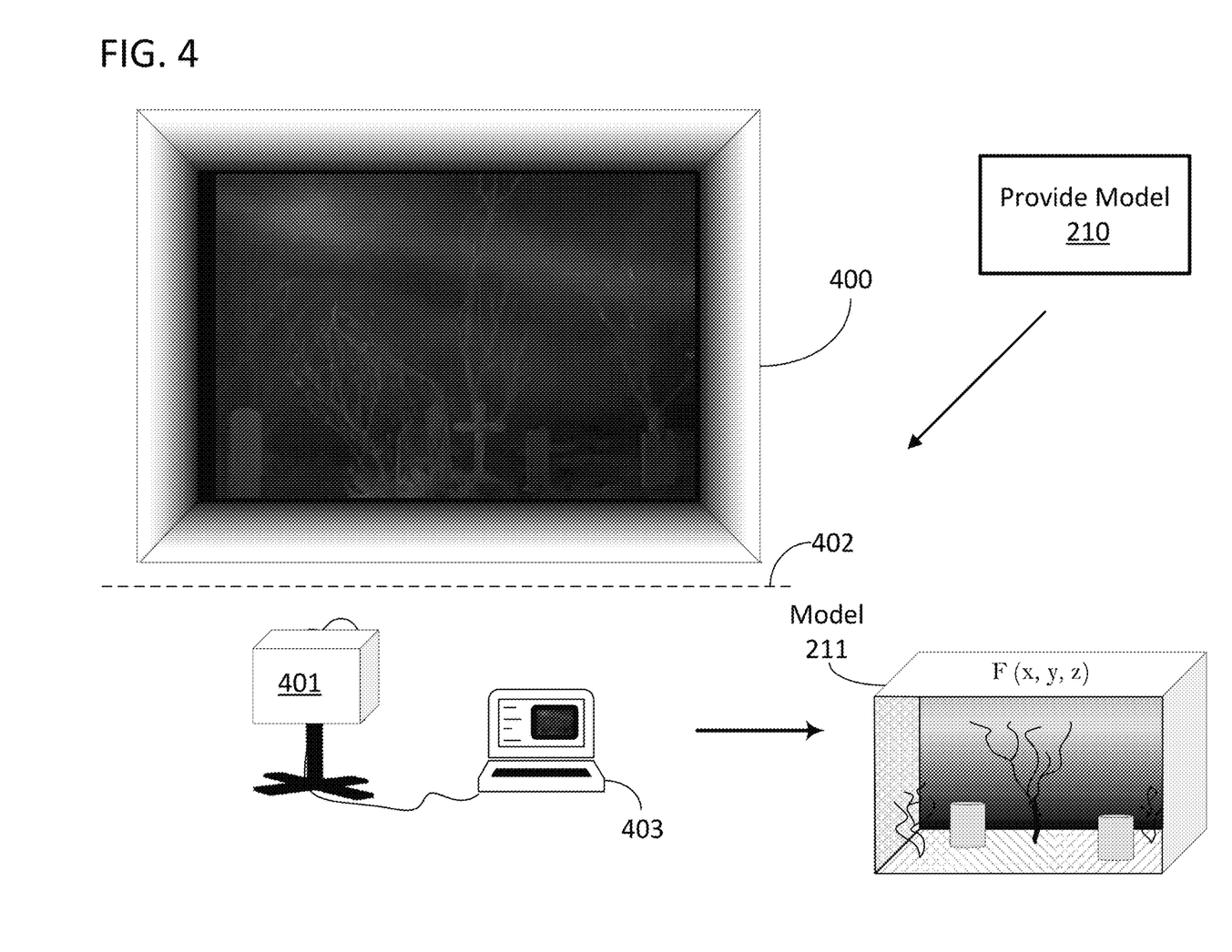
FIG. 4 is a data flow diagram for a method for generating a model of a scene in accordance with specific embodiments of the invention.

Returning to the example of a three-dimensional model of a given scene background, FIG. 4 provides an illustration of how such a model could be generated. As stated previously, this type of model can be used to synthesize training data for a segmentation network that is being trained to segment images from a variable perspective scene, potentially where the variable perspective is not known ex ante, but where the set on which the scene is to be captured is known. As such, the model is designed to provide a scene background from any potential camera pose that could be used to capture a scene from the modeled set. Using this type of process, the trained network can thereby convert any set into an effective green screen for easily and accurately segmenting subjects from the set during post processing, or on the fly.

Set 400, which is an actual physical space on which a scene will take place, can be captured using a three-dimensional scan. For example, a visible light camera augmented with depth sensors 401 could be carried around the set, in and around obtruding set pieces, to capture an entire scan of the scene. The depth sensors could be LIDAR sensors. In specific embodiments of the invention, the camera would not include a depth sensor and computer vision techniques could be applied to harvest depth information directly from visible light data. Multiple visible light cameras could be used for this purpose to take advantage of stereo capture processing techniques. Regardless of the type of sensor used, the capture could create an RGB-D cloud description of the set, a three-dimensional graphics mesh, or any three-dimensional CAD model overlaid with images of the set. Generation of the model 211 could be conducted by a computing device 403 that was either an on-set device, or a remote computer used for post processing of the capture.

In specific embodiments, the camera 401 will not be used to capture the entire set and will instead only be used to model portions of the set that might conceivably be captured in the set of potential perspectives. For example, if it was known that the varying perspectives of set 400 would only be captured from behind line 402, then the scan, and resulting model, might be limited to only those portions of set 400 that are visible from behind line 402.

The scan of set 400 might also include lighting condition capture including capturing a description of the lighting locations and types of lights on set 400. This information could include surface properties for surfaces on set 400 in terms of the manner in which the surfaces respond to lighting. The capture could therefore involve physically altering the condition of set lighting to capture the set under different potential lighting conditions. Alternatively, if the light sources were known and were well modeled, such as in the case of an indoor scene that is shot entirely with artificial lights of known characteristics, then a model of the lights could form part of the model and be used to derive different lighting conditions in combination with the surface information.

The scan of the set could be aided with the use of a computing device 403 on set to display to a user which portions of set 400 had yet been captured. The same device could also be used to keep track of lighting conditions that needed to be captured. The same device could also be used to adjust the lighting of a given set. Furthermore, the same device could also be used to guide motors fixed to camera 401 for purposes of guiding the capture. This device could be a tablet device with installed software to allow users to guide captures of a given set. If the camera pose, and any artificial set lighting, were controlled by computerized actuators, the entire capture could be fully or semi-automated.

Figure 5:
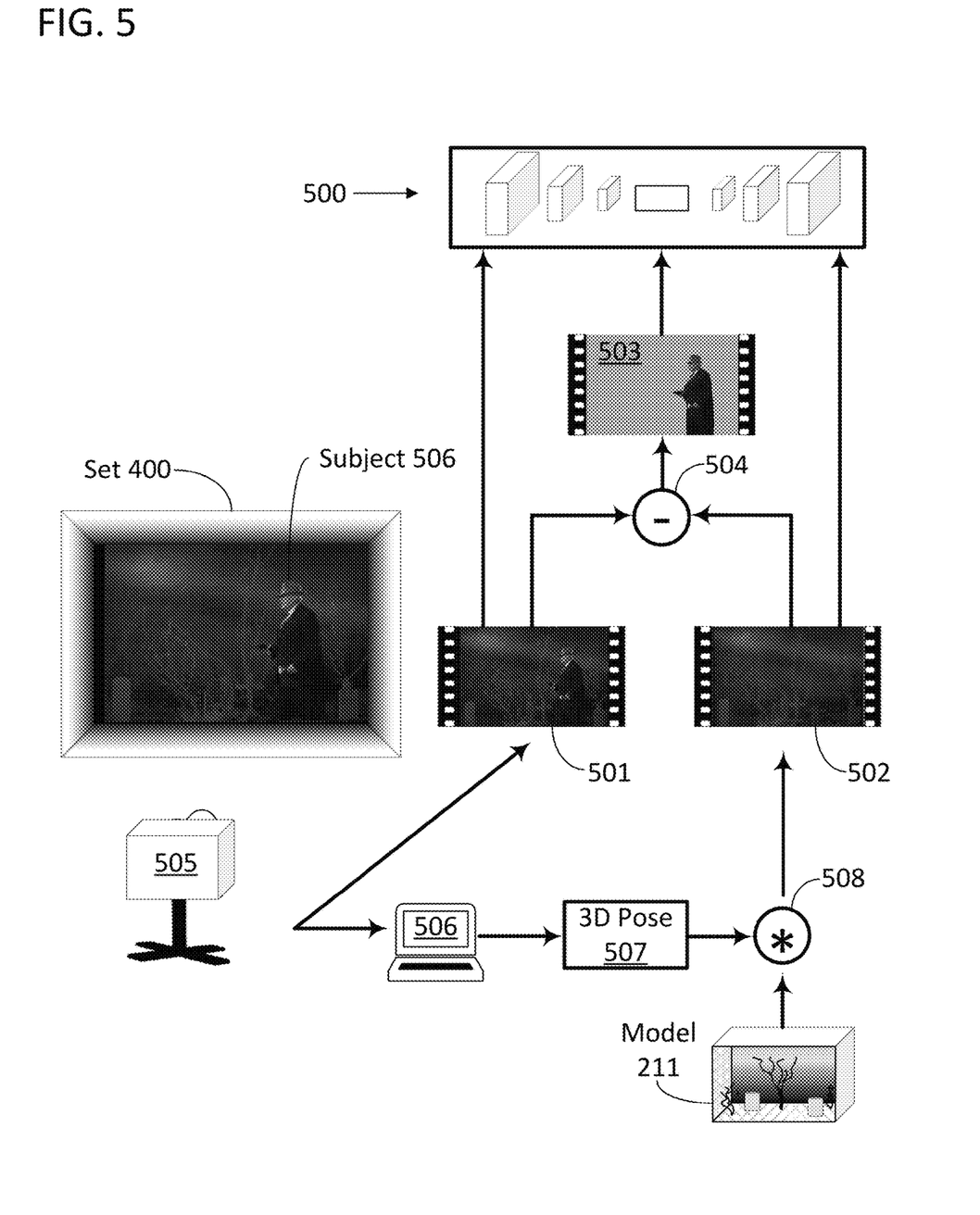
FIG. 5 is a data flow diagram for specific approaches for segmenting a subject from a scene using a model of the scene in accordance with specific embodiments of the invention.

FIG. 5 is a data flow diagram for specific approaches for segmenting a subject from a scene using a model of the scene in accordance with specific embodiments of the invention. FIG. 5 includes a network 500 which receives a frame 501, a frame background 502, and an approximate segmentation 503. The frame background 502 can be derived using a model of the scene in accordance with specific embodiments described with reference to flow chart 200. The approximate segmentation can be generated using an absolute difference operation 504 in accordance with specific embodiments of step 230 described above. Frame 501 can be captured using a camera 505 capturing a scene in front of set 400. As illustrated, frame 501 includes a subject 506, which in this case is an actor in the process of walking across set 400.

Network 500 can be designed to generate an inference that segments subject 506 from frame 501 using an input consisting of: frame 501; approximate segmentation 503; frame 501 in combination with approximate segmentation 503; or any of the aforementioned in this list in combination with frame background 502. Any of the inputs in the previous list can be combined to serve as inputs to network 500 by merging the data into larger and larger data structures with the elements of each portion simply added to an additional dimension of the existing data structure. Given the way networks such an ANNs operate, the network will be able to extract meaning from the input without an undue degree of focus on how the data is merged.

Network 500 can also be designed to generate an inference that segments subject 506 from frame 501 alone, but the additional inputs could be used as training data for a supervised training routine. Approximate segmentation 503 could serve as a supervisor for a training routine in which frame 501 was applied to network 500. In these embodiments, frame background 502 could likewise either serve as a supervisor for a training routine to train network 500 or as an input for drawing an inference from network 500 when combined with approximate segmentation 503 or frame 501.

In specific embodiments of the invention, generating frame background 502 requires a model of set 400 and information regarding the capture of frame 501. In the illustrated case, the step of providing the model of the scene background comprises capturing a three-dimensional model of the scene background as in FIG. 4. The model 211 is a model of the scene background in that it is a model of set 400 and set 400 includes the background of the scene because the scene will be shot on set 400. The information regarding the capture of frame 501, which is used to determine the frame background, can include the camera pose used by camera 505. It can also include information captured by camera 505 regarding the lighting condition of the scene, the capture parameters of camera 505, the calibration of camera 505, and other factors which might cause a discrepancy between the ground truth background of frame 501 and the derived frame background 502.

In specific embodiments of the invention, determining frame background 502 from the model comprises generating frame background 502 using the three-dimensional model 211 and a camera pose 507 of frame 501. The camera pose 507 of the frame is the pose of camera 505 relative to set 400 which was used to capture frame 501. The camera pose of camera 505 used to capture frame 501 can be derived from natural features in set 400 and computer vision techniques, and/or fiducial tags in set 400 that are robust to subject occlusion. In specific embodiments, determining frame background 502 from model 211 can include registering model 211 with trackable tags in the scene background. For example, April tags could be placed in set 400 during capture with camera 505 for obtaining frame 501, and during the capture with sensor 401 to generate the model in the first place. Camera pose can be derived using a computer 506 operating on frame 501. The computer 506 can also access information provided by camera 505 directly regarding its physical positioning relative to the space if it is controlled by a moving crane, dolly, or other equipment that is, at least indirectly, registered with model 211.

Deriving frame background 502 from camera pose 507 involves projecting the 3D model from the point of view of the camera 505 (potentially with other additional information). The model can then render this projection in the form of frame background 502. The operation is illustrated by combination block 508 to illustrate that it is the combination of camera pose and model information that generates the frame background. The additional information can be the lighting information, camera pose, camera parameters, and other information that can be used by the model to render frame backgrounds as mentioned above.

Figure 6:
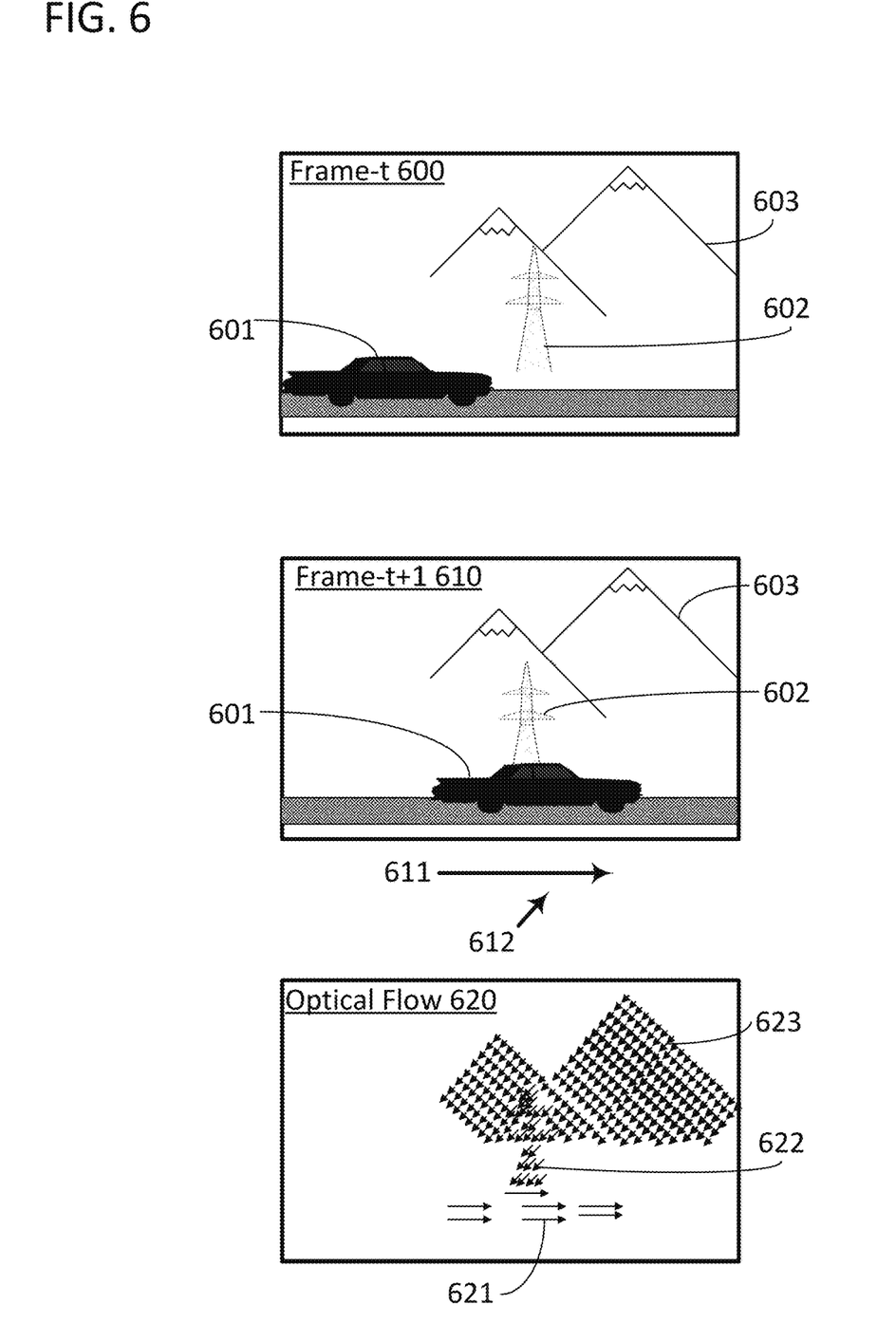
FIG. 6 is an illustration of the concept of optical flow as used in accordance with specific embodiments of the invention.

In specific embodiments of the invention, the model of the scene background includes a trained optical flow network and a set of key frames of the scene background. The set of key frames can be frames taken from a variable perspective matching the variable perspective that will be used to capture the scene. FIG. 6 provides an illustration of the concept of optical flow. The figure includes a first frame take at time "t" 600 which includes a car 601, a utility pole 602, and two mountains in the background 603. The figure also includes a second frame taken at time "t+1" 610 which includes the same subjects. However, car 601 has moved across the frame in accordance with the motion vector 611. In addition, the camera has moved from frame 600 to 610, in accordance with motion vector 612, such that the utility pole 602 and mountains 603 are at different places in the frame also. The degree to which they have moved in the frame is different due to their distance from the camera.

Region 620 of FIG. 6 presents the optical flow for the scene comprising frames 600 and 610. The optical flow includes a value on a per pixel basis as to how the pixels moved from one frame to the next. As seen, a collection of pixels associated with the mountains 623 express minor motion opposite to the direction of the camera's movement. The collection of pixels associated with the utility pole 622 express a slightly larger degree of motion in the same direction. The collection of pixels associated with the car 621 express a high degree of motion from frame 600 to 610. It should also be noted that certain portions of utility pole 602 are occluded in frame 610, as a result, there corresponding values in the optical flow will by a null value representing the fact that they are occluded in the next frame. In dense optical flow, all pixels get flow vectors or indications that they are not visible in the next frame.

In specific embodiments of the present invention, an optical flow network is trained to generate optical flow given a frame or set of frames. The flow vectors, or null values, can be assigned to each primary element in a frame. That network and a clean plate capture of a scene or set can be combined to serve as the model in FIG. 2 above. The clean plate capture of the scene or set can be of a subset of the total number of frames that would otherwise be required to model or render the entire set or scene. For example, the subset could be a set of "key" frames that capture the main shots in the scene, sample variant portions of the set, or that otherwise provide an adequate scaffolding for the optical flow network to fully model the scene or set with those frames as a reference. The key frames can be selected from a full clean plate capture of a scene perspective path or set as part of providing the model of the scene. The "key" frames can involve different view of the scene, set, or a particular object and cover a range of camera movements and changes in zoom. The optical flow network can then be trained to produce dense optical flow from the "key" frames to provide a frame background for any frame. The frame background can include background for any occluded part of the scene.

The optical flow network can be trained using synthesized occlusions. Such approaches would be beneficial in that the model may need to operate with objects in the foreground (e.g., subject 506 covers a portion of set 400 and the network should still function with this occlusion). The optical flow network can be trained on a clean plate scene background using synthesized motion data. The synthesized motion data can be introduced by shifting a composited object in one frame to another. The training data could also include real physical occlusions and movement introduced to the scene or set. The training data could include several layers of shifting frame segments to composite multi-motion ground truth movements as might occur in a scene. The occlusions could be traveling in multiple directions across the background. The network can be trained on further augmented data such as 3D rotations around the optic center and lighting changes. The network can be trained to adjust the lighting to new lighting conditions synthesized in the scene. Regardless of the occlusions, lighting changes, etc. the network can be trained to flow all the primary elements from key frames to the target frame even if they are occluded. The flow can be dense optical flow and include marking primary elements out of the frame (i.e., out of field of view) or occluded by parallax of the scene.

Figure 7:
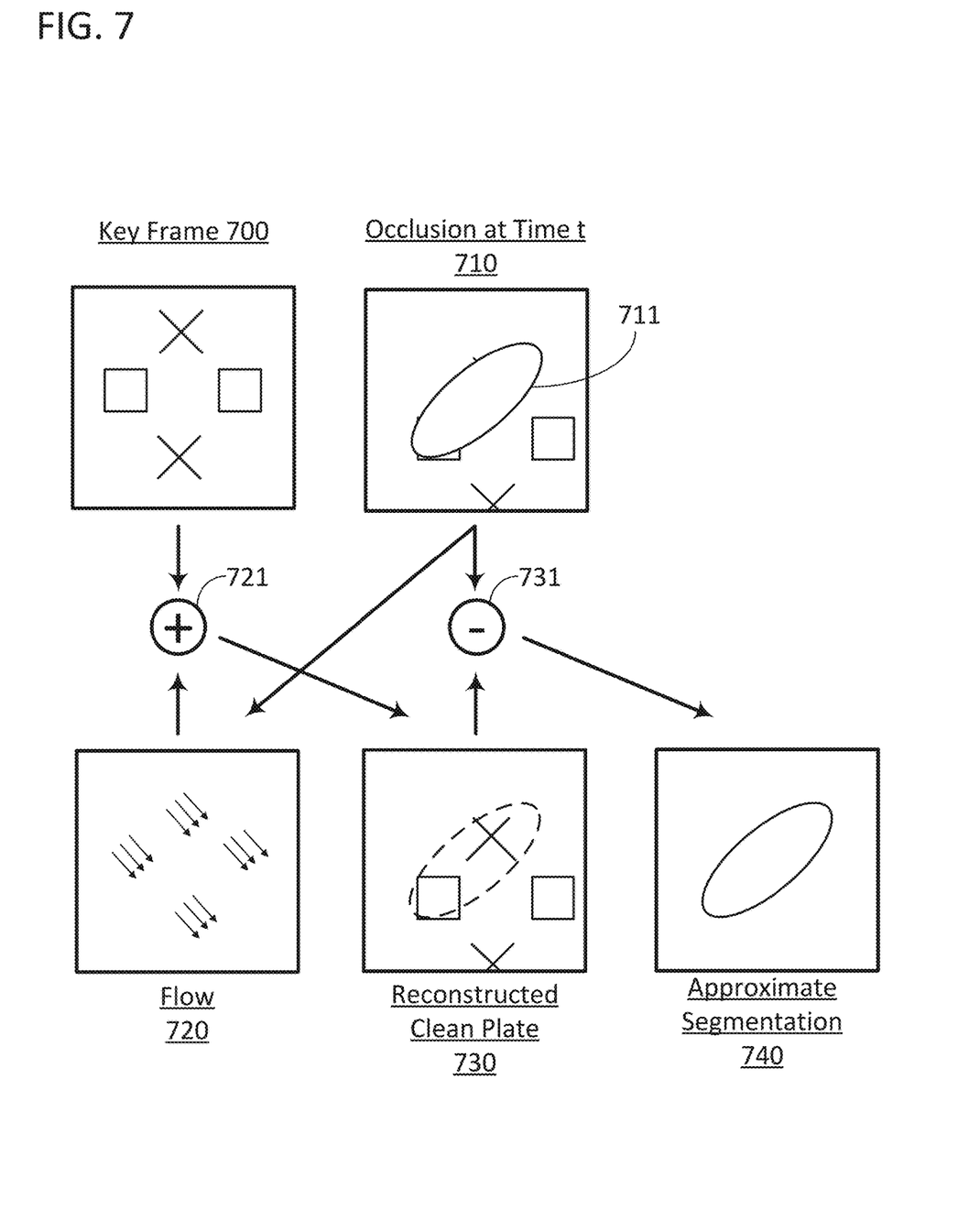
FIG. 7 is a data flow diagram for specific approaches for using optical flow to segment a subject from a scene in accordance with specific embodiments of the invention.

FIG. 7 provides a data flow diagram that can be used to explain the use of an optical flow network as part of a model in accordance with specific embodiments of the invention. The figure includes one key frame 700 of the scene the optical flow model will be generating frame backgrounds for. The figure also includes a frame captured at time "t" 710. Frame 710 is captured during run time and includes an occlusion 711. In the illustrated case, the occlusion 711 is also the subject that should be segmented from the frame. With reference to FIG. 2, frame 710 can be the frame provided in step 201. The optical flow network will be trained to produce flow 720 from at least frame 710. In specific embodiments of the invention, the optical flow network will also use key frame 700 as an input in addition to frame 710 in order to generate flow 720. The optical flow network can also be trained to generate lighting changes for each of the primary elements to transform the lighting condition of each element in key frame 700 into the lighting condition that the primary elements in frame 710 are experiencing. Returning to FIG. 2, the model provided in step can include the optical flow network used to generate flow 720 and can also include the key frame 700, in addition to other key frames.

After flow 720 has been inferred by the optical flow network, the frame background can be generated by applying the optical flow 720 to key frame 700 as in operation 721. The frame background can take the form of reconstructed clean plate 730. As illustrated, the background objects will have effectively shifted since the primary elements associated with those background object have been "moved" in accordance with dense optical flow 720 from key frame 700 to reconstructed clean plate 730. With reference to FIG. 2, operation 721 can involve the execution of step 220. As illustrated by FIG. 7, approaches in which the optical flow network has been trained with synthesized occlusions are beneficial because occlusions such as 711 will likely be present at run time given the fact that the frames include subjects as well as background. Training with lighting variations are also beneficial in that key frame 700, which is captured for training and model building, may have different lighting conditions than frame 710, which is captured at run time when the model has been trained and is being used.

The process illustrated in FIG. 3 continues by subtracting the reconstructed clean plate 730 from frame 710 in operation 731. The result of this operation is approximate segmentation 740. With reference to FIG. 2, operation 731 can involve the execution of step 231, and approximate segmentation 720 can be put to all of the uses described for approximate segmentation 232. The other variations of FIG. 2 described herein, including the post processing described with reference to FIG. 3 can also be applied to approximate segmentations generated through the use of an optical flow network model.

Using specific embodiments of the invention disclosed herein, a network can generate a segmentation that is more accurate than the approximate segmentation for several reasons. First, the model might not be a complete and accurate representation and there may be errors, noise, or missing parts that are not captured for various reasons (e.g., parallax). Regardless, even if the model is accurate, the real scene has its own changes due to difference in things such as sun position, lighting changes, change of camera (noise, gain, exact color processing), camera calibration and position errors which might not be accurately reflected by the model or provided to the model for accurate rendering of the frame background. Also, the subject may have colors or textures that are identical to background which the naïve absolute difference operation will not properly segment. However, all these errors, offsets, and issues with a naïve approach can be absorbed within and countered by a network given enough training data. Therefore, regardless of the availability of an approximate segmentation, a segmentation network is useful for accurate segmentations. The increased accuracy provided by such segmentation networks is particularly beneficial in high fidelity and low error tolerance applications such as in post processing for feature length films, high quality television shows, and sporting events.

While the specification has been described in detail with respect to specific embodiments of the invention, it will be appreciated that those skilled in the art, upon attaining an understanding of the foregoing, may readily conceive of alterations to, variations of, and equivalents to these embodiments. While the example of a visible light camera was used throughout this disclosure to describe how a frame is captured, any sensor can function in its place to capture a frame including depth sensors without any visible light capture in accordance with specific embodiments of the invention. Additionally, while the concept of a frame depicting a real world captured environment was used throughout this disclosure, the frame can be derived from a virtual environment for which segmentation is not available, and the capture device in this case can be any device used to collect a rendered frame from this virtual environment. While the example of a two-dimensional scene was used throughout this disclosure, the disclosure is equally applicable to segment three dimensional frames where the elementary elements of the frame are three-dimensional voxels as opposed to pixels. Any of the method steps discussed above can be conducted by a processor operating with a computer-readable non-transitory medium storing instructions for those method steps. The computer-readable medium may be memory within a personal user device or a network accessible memory. Modifications and variations to the present invention may be practiced by those skilled in the art, without departing from the scope of the present invention, which is more particularly set forth in the appended claims.

What is claimed is:

1. A computer-implemented method comprising:
providing a frame of a scene, the scene including a scene background, the scene background being a chroma screen;
providing a model of the scene background based on fitting an intensity plane to the chroma screen in the frame;
determining a frame background using the model based on mixing a chroma of the chroma screen with the intensity plane;
subtracting the frame background from the frame to obtain an approximate segmentation; and
training a segmentation network using the approximate segmentation.

2. The computer-implemented method of claim 1, further comprising:
segmenting, after training the segmentation network, a second frame from the scene using the segmentation network.

3. The computer-implemented method of claim 1, wherein training the segmentation network using the approximate segmentation comprises:
tagging a first portion of the frame, included in the approximate segmentation, with a subject tag;
tagging a second portion of the frame, excluded from the approximate segmentation, with a background tag;
generating a segmentation inference from the segmentation network using the frame; and
evaluating the segmentation inference with at least one of the subject tag and the background tag.

4. The computer-implemented method of claim 3, wherein training the segmentation network using the approximate segmentation comprises:
morphologically dilating the approximate segmentation to define the second portion of the frame; and
morphologically eroding the approximate segmentation to define the first portion of the frame.

5. The computer-implemented method of claim 1, wherein:
providing the model of the scene background comprises capturing a three-dimensional model of the scene background; and
determining the frame background from the model comprises generating the frame background using the three-dimensional model and a camera pose of the frame.

6. The computer-implemented method of claim 1, wherein determining the frame background from the model comprises:
registering the model with a set of trackable tags in the scene background;
deriving a camera pose for the frame using the set of trackable tags; and
deriving the frame background using the model and the camera pose of the frame.

7. The computer-implemented method of claim 1, wherein:
providing the model of the scene background comprises: (i) capturing a clean plate scene background; (ii) selecting a set of key frames from the clean plate scene background; and (iii) training, using the clean plate scene background, an optical flow network; and
determining the frame background from the model comprises inferring the frame background using the optical flow network.

8. The computer-implemented method of claim 7, wherein:
training the optical flow network includes synthesizing occlusions on the clean plate scene background.

9. A non-transitory computer-readable medium storing instructions to execute a computer-implemented method, the method comprising:
providing a frame of a scene, the scene including a scene background, the scene background being a chroma screen;
providing a model of the scene background based on fitting an intensity plane to the chroma screen in the frame;
determining a frame background from the model based on mixing a chroma of the chroma screen with the intensity plane;
subtracting the frame background from the frame to obtain a frame foreground; and
training a segmentation network using the frame foreground.

10. The non-transitory computer-readable medium of claim 9, the method further comprising:
segmenting, after training the segmentation network, a second frame from the scene using the segmentation network.

11. The non-transitory computer-readable medium of claim 9, wherein training the segmentation network using the frame foreground comprises:
tagging a first portion of the frame, included in the frame foreground, with a subject tag;
tagging a second portion of the frame, excluded from the frame foreground, with a background tag;
generating a segmentation inference from the segmentation network using the frame; and
evaluating the segmentation inference with at least one of the subject tag and the background tag.

12. The non-transitory computer-readable medium of claim 11, wherein training the segmentation network using the frame foreground comprises:
morphologically dilating the frame foreground to define the second portion of the frame; and
morphologically eroding the frame foreground to define the first portion of the frame.

13. The non-transitory computer-readable medium of claim 9, wherein:
providing the model of the scene background comprises capturing a three-dimensional model of the scene background; and
determining the frame background from the model comprises generating the frame background using the three-dimensional model and a camera pose of the frame.

14. The non-transitory computer-readable medium of claim 9, wherein determining the frame background from the model comprises:
registering the model with a set of trackable tags in the scene background;
deriving a camera pose for the frame using the set of trackable tags; and
deriving the frame background using the model and the camera pose of the frame.

15. The non-transitory computer-readable medium of claim 9, wherein:
providing the model of the scene background comprises: (i) capturing a clean plate scene background; (ii) selecting a set of key frames from the clean plate scene background; and (iii) training, using the clean plate scene background, an optical flow network; and determining the frame background from the model comprises inferring the frame background using the optical flow network.

16. The non-transitory computer-readable medium of claim 15, wherein:
training the optical flow network includes synthesizing occlusions on the clean plate scene background.

\* \* \* \* \*